(12) United States Patent
Christoph

(10) Patent No.: US 6,822,749 B1
(45) Date of Patent: Nov. 23, 2004

(54) METHOD AND ARRANGEMENT FOR DETERMINING THE GEOMETRY OF OBJECTS USING A COORDINATE MEASURING DEVICE

(75) Inventor: Ralf Christoph, Schöffengrund (DE)

(73) Assignee: Werth Messtechnik GmbH, Giessen (DE)

(*) Notice: Subject to any disclaimer, the term of this patent is extended or adjusted under 35 U.S.C. 154(b) by 0 days.

(21) Appl. No.: 09/646,910

(22) PCT Filed: Apr. 10, 1999

(86) PCT No.: PCT/EP99/02568

§ 371 (c)(1),
(2), (4) Date: Oct. 11, 2000

(87) PCT Pub. No.: WO99/53268

PCT Pub. Date: Oct. 21, 1999

(30) Foreign Application Priority Data

Apr. 11, 1998 (DE) .......................... 198 16 270

(51) Int. Cl.⁷ ............................................. G01B 11/24
(52) U.S. Cl. ........................................ 356/609; 33/503
(58) Field of Search ........................... 356/609; 33/503, 33/559

(56) References Cited

U.S. PATENT DOCUMENTS

| | | | | |
|---|---|---|---|---|
| 4,161,756 A | * | 7/1979 | Thomas | 348/347 |
| 5,615,489 A | * | 4/1997 | Breyer et al. | 33/503 |
| 5,825,666 A | * | 10/1998 | Freifeld | 33/503 |

FOREIGN PATENT DOCUMENTS

| | | | |
|---|---|---|---|
| DE | 2611639 | | 9/1977 |
| DE | 29710242 | | 9/1997 |
| DE | 196 39 780 | * | 4/1998 |

OTHER PUBLICATIONS

R. J. Ahlers & W. Rauh, "Koordinatenmesstechnik mit Bildverarbeitung" (1989), No. 11, Nov., pp. 12–16.

* cited by examiner

Primary Examiner—Richard A. Rosenberger
(74) Attorney, Agent, or Firm—Dennison, Schultz, Dougherty & MacDonald

(57) ABSTRACT

The invention relates to a method and an arrangement for determining the geometry of objects using a coordinate measuring device. An optical system (10) is used to form an image of at least one light or scanning spot whose position depends on the geometry of the object on at least one detector (30). The imaging scale, depth of field and distance from the object are adjusted by means of a zoom lens (18) whose lens groups (20, 22) are each power driven and are axially displaceable.

17 Claims, 1 Drawing Sheet

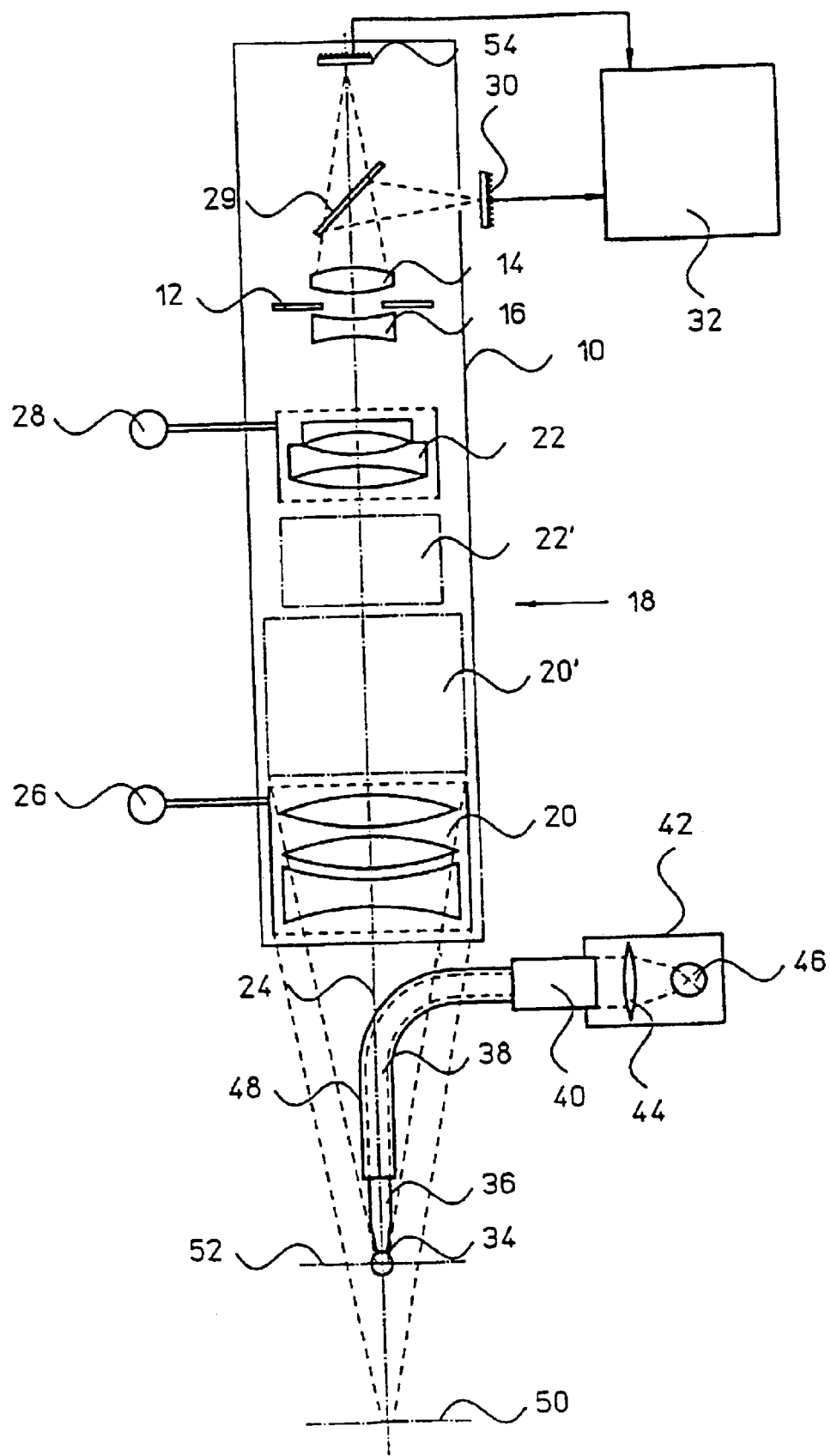

METHOD AND ARRANGEMENT FOR DETERMINING THE GEOMETRY OF OBJECTS USING A COORDINATE MEASURING DEVICE

BACKGROUND OF THE INVENTION

The invention relates to a method and an arrangement for measurement of the geometry of objects by means of a coordinate measuring instrument with an optical system for measuring and imaging of at least one light dot, light spot, contrast transaction or edge of which the position is determined by the geometry, on at least one detector whose output signals are evaluated, where a selectable imaging scale and a selectable distance from the respective object can be adjusted using the optical system.

A method and an arrangement of the type described above are known (R.-J. Ahlers, W. Rauh: "Koordinatenmesstechnlk mit Bildverabeitung" in VDI-Z 131 (1989) No. 11, p. 12, 16). The known coordinate measuring machine (CMM) has a special optical system with telecentric beam path. The system is furthermore designed such that a change in magnification does not result in any change in the object distance. For height measurements, an autofocus feature is provided for the known coordinate measuring instrument and operates as a zero indicator, making an additional mechanical movement necessary in the third dimension.

Also known is a control unit for lenses with variable focal distance, in which a front lens group, a first sliding element for focal distance alteration and a second sliding elements for keeping the image location constant are each connected to drive systems for axial displacement. The control contains a gate circuit with which the optical sliding elements can be immobilized at any point regardless of the input conditions (DE 26 11 639 C3).

A coordinate measuring machine (CMM) is known from DE 196 39 780 A1 using which measurement is both tactile and optical for determination of the structures of objects. This permits automatic focusing of the optical system by means of a camera. A coordinate measuring machine is known from U.S. Pat. No. 5,035,503 with a zoom lens that is used for measuring and correcting movement errors in a classic coordinate measuring instrument. The lens itself is not used for direct measuring of objects.

Finally, a device is known for measuring geometry structures with a photogrammetric system, a feeler pin of flexible steel and a sensing element connected to the shaft, that is brought into contact with the object to be measured during measuring. The shaft is provided with targets, e.g. balls, whose position relative to the feeler reference system is determined by the photogrammetric system. The position of the sensing elements is measured from the target positions that emit light (DE 297 10 242 U1).

The problem underlying the present invention is to provide a method suitable for a wide range of applications, and an arrangement for use in a wide range of applications for measuring the geometry of objects with an optical system that determines at low cost light generated depending on the geometry, and images it on at least one detector and permits high resolutions in a wide measuring range.

SUMMARY OF THE INVENTION

The problem is solved in a method of the type mentioned at the outset and in accordance with the invention substantially in that the optical system comprises a zoom lens of which the lens groups are each moved separately by motor power into positions for the imaging scale and the distance from the object. This method is suitable for precise measurement of geometries that can differ greatly in their profile.

In a particularly expedient embodiment, the topography-dependent light is generated by a feeler element that is brought into contact with the object and whose position is ascertained directly or indirectly using the optical system by at least one target. This embodiment permits a choice between an optical, i.e. proximity-type method, and an optical/mechanical method working with mechanical sensing. The selection depends on the type of geometry to be measured, on the material properties, on the required imaging scale, on the required depth of field and on the required measuring distance/working distance.

In measurement of the geometry of the object with the aid of the feeler element, the working distance of the optical system is ideally set with the zoom lens in such a way that the object/measuring plane is in the center of the feeler element.

In measurement of the surface topography without feeler element, i.e. only optically, the working distance of the optical system is preferably set using the zoom lens in such a way that the object/measuring plane is in front of the feeler element. The feeler element is here outside the depth of field of the optical system and is not visible.

Alternatively, it is possible with the zoom lens to set the object/measuring plane spatially on that side of the feeler element facing the object.

In particular, the position of the feeler element and/or of the at least one target is determined by means of light beams reflecting from and/or shading it/them and/or emanating from the feeler element.

It is expedient if the deflection of the feeler element caused when the object is contacted is measured by means of the optical system. The deflection can be ascertained by the displacement of the image of the feeler element on the detector. It is also possible to determine the deflection of the feeler element by evaluation of the contrast function of the image using an image processing system. The deflection can also be determined from a change in the size of the image of the at least one target, this image depending on the beam-optical correlation between the object distance and the magnification. Furthermore, the deflection of the feeler element can be determined by the apparent size change of the target image caused by the loss of contrast due to defocusing.

In an arrangement for measuring the geometry of objects by means of a coordinate measuring instrument with an optical system for determining and imaging of at least one light dot, light spot, contrast transition or edge of which the position is determined by the surface topography, on at least one detector whose output signals can be evaluated, with the optical system being designed for setting of a selectable imaging scale and of a selectable distance from the respective object, the problem is substantially solved in accordance with the invention in that the optical system has a zoom lens containing at least two lens groups separately axially movable by motor power. With the lens groups or lens packages, the imaging scale and/or the working distance and/or the depth of field can be changed or set.

In an advantageous embodiment of the arrangement, a feeler element and/or at least one target assigned thereto is provided for optical position determination in front of the optical system. With the arrangement of the feeler element and/or at least one target, the measuring arrangement in accordance with the invention can operate in two different modes. In the one operating mode, the geometry is measured without contacting the object. In the other mode, the geometry is indirectly optically measured by sensing and deflection of the feeler element. In measurement without feeler element, the zoom lens or vario-lens is set so that the object/measuring plane is located in front of that side of the feeler element facing the optical system, i.e. the feeler element is outside the depth of field of the optical system. The feeler element is "invisible". If the deflection of the feeler element is used for measurement, then the object plane is moved to the center of the feeler element by means of the zoom lens.

The feeler element is preferably arranged at the end of a flexible glass fiber or light guide feeler pin. The glass fiber feeler pin can be designed with a spherical end. It is also possible to provide the glass fiber feeler pin with at least one target. Light is supplied via the light guide to the end of the pin or to the target(s) and is emitted by the end or by the targets.

It is however also possible to design the feeler element or target as a reflector at or on a pin.

The pin or glass fiber pin is preferably curved to an L-shape, with the section adjacent to the end being arranged along the optical axis of the optical system.

With the two operating modes possible the range of application for the measuring arrangement in accordance with the invention is expanded. The type of measurement can be matched to the structure of the respective object surface. The measuring arrangement is therefore suitable for testing roughness, shape or waviness even of difficult contours. Surface structures of both hard and soft materials such as rubber or plastic can be measured.

For a defined setting of the sensing force of the feeler element, the flexible pin or shaft can be mounted in a rigid or substantially rigid guide, if necessary movably, which the pin or shaft projects beyond by a required bending length afforded by the feeler element or by a target assigned thereto.

Further details, advantages and features of the invention are shown not only to the claims and in the features they contain—singly and/or in combination—but also in the following description of a preferred embodiment shown in the drawing.

DETAILED DESCRIPTION OF THE PREFERRED EMBODIMENT

The drawing shows in diagrammatic form an arrangement of a coordinate measuring machine (CMM) for determining the geometry of objects. The arrangement contains an optical system 10 comprising a basic lens 14 arranged behind a diaphragm 12 and a fixed lens 16 arranged in front of the diaphragm 12. A zoom lens of vario-lens 18 forms the attachment in front of the basic lens 14. The zoom lens 18 contains a first lens group 20 or first lens package and a second lens group 22 or second lens package. The two lens groups 20, 22 can be adjusted independently and separately of one another by motor power in their axial positions along an optical axis 24 of the optical system 10. In the drawing, the adjustability is shown in the diagram form by a motor drive 26 connected to the lens group 20 and by a motor drive 28 connected to the lens group 22. In an imaging plane behind the basic lens 14, arranged outside the optical system 10 moveable along the optical axis 24, is a detector 30, in particular photoelectrical, which is supplied with the beams emanating from the basic lens 14 via a deflecting mirror 29 and which is connected on its output side to an evaluation unit 32 which prepares and processes the output signals of the detector 30. The evaluation unit 32 contains in particular a computer. The detector 30 is for example a camera.

At a distance in front of the optical system 10 is a feeler element 34 arranged at the end of a feeler pin 36. The feeler pin 36 is curved or angled into an L-shape. That section of the feeler pin before the curve and connected to the feeler element 34 is arranged along the optical axis 24, which also passes through the feeler element 34. At least one target can be arranged on the feeler pin 36, but is not shown in the drawing. The deflecting mirror is partially translucent.

The feeler element 34 and/or the target can be designed as an element reflecting or spatially emitting radiation, in particular as a ball or cylinder.

The feeler pin 36 is flexible at least in that section adjacent to the feeler element 36. A section 38 at right angles to the optical axis 24 is arranged in its end in a sleeve 40 that is fastened to a holder 42. The holder 42 can be connected to a drive mechanism movable in five degrees of freedom. The holder 42 and the optical system 10 can be connected to one another or form a rigid unit. The sleeve 40 is designed rigid or substantially rigid such that the free end of the flexible feeler pin 36 projecting beyond the sleeve 40 has a defined bendability, so that a required sensing force of the feeler element 34 can be preset. The shaft or feeler pin 36 can here be firmly mounted inside the guide or sleeve 40 or be designed movable relative to it, in order to preset the bending length, i.e. that section which projects beyond the sleeve 40.

The feeler pin 36 is preferably designed as a light guide or glass fiber guide, the end of which arranged inside the holder 42 receives light from a light source 46 via a lens 44. The light guide is surrounded by an opaque cover 48 except for the section adjacent to the translucent feeler element 34.

With the arrangement shown in the drawing, surfaces of objects can be measured using two different methods, i.e. a proximity-type or a mechanical/optical one. With the proximity-type, optically sensing method, the zoom lens 18 is set such that the working clearance 50 is in front of the feeler element 34. The lens groups 20 and 22 are here in the positions shown in the drawing by unbroken lines. In this setting the feeler element 34 is outside the depth of field of the optical system 10. This means that it is not visible and is therefore not imaged. With the non-contact scanning, for example, the surfaces of elastic or even soft material can be measured.

In the mechanical/optical method the position of the feeler element 34 brought into mechanical contact with the surface of the object is measured. Before this, the zoom lens 18 is set such that the object/measuring plane 52 is in the middle of the feeler element, the so-called feeler ball. It is therefore the position of the feeler element 34 or of the target, not shown, that is measured. Deformations of the feeler pin 36 do not affect the measurement.

Deflections in the direction vertical to the sensor or camera axis can be determined directly by displacement of the image in a sensor field 54, in particular an electronic camera, arranged behind the partially translucent deflecting mirror 29. The image can be evaluated using an image processing system installed in a coordinate measuring instrument in the evaluation unit 32. This permits a two-dimensionally operating feeler system to be achieved that can be coupled very easily to an optical evaluation unit.

For sensing of the deflection in the direction of the optical sensor/camera axis, there are several possibilities, including the following:

1. The deflection of the feeler element 34 in the direction of the sensor axis 24 (camera axis) is measured by the detector 30, a focus system as already known in optical coordinate measurement technology for focussing on the workpiece surface. Here the contrast function of the image is evaluated in the electronic camera.

2. The deflection of the feeler element in the direction of the sensor/camera axis is measured by evaluation of the imaging size of a target, for example the change in diameter in the case of a circular or annular target. This effect results from the beam-optical image and can be selectively optimized by the design of the optical unit.

3. In a third option too the size change of the target is evaluated, however this is the change resulting from the combination of beam-optical size change and the apparent enlargement due to fuzzy edges. Compared with evaluation of the lack-of-focus function, this method benefits from the fact that the actual size of the target is invariable.

The two lens groups 20 and 22 are, in the case of object measurement with the feeler element 34, at a smaller distance from one another than in optical sensing. The corresponding positions of the lens groups 20, 22 are shown in the drawing with 20' and 22' respectively.

With the measuring arrangement described above, the imaging scale, the depth of field and the working distance can be altered or adapted to suit the precision and speed requirements for surface sensing. Since the measuring arrangement can also be matched to the material properties such as hardness, it is suitable for a wide range of applications.

What is claimed is:

1. A method for measuring the geometry of objects by means of a coordinate measuring machine with an optical system for measuring and imaging of at least one light dot, light spot, contrast transition or edge of which the position is determined by the geometry, on at least one detector whose output signals are evaluated, where a selectable imaging scale and a selectable distance from the respective object can be adjusted using the optical system, wherein the optical system comprises a zoom lens of which the lens groups are each moved separately and independently by motor power into positions for adjusting the imaging scale and for adjusting the working distance from the object to either keep the working distance constant and change the imaging scale or to keep the imaging scale constant and to change the working distance.

2. Method according to claim 1, wherein the light dot, light spot, contrast transition or edge is generated by a feeler element (34) which is brought into contact with the object and whose position is ascertained directly or indirectly using the optical system (10) by at least one target.

3. Method according to claim 2, wherein the deflection of the feeler element (34) resulting from the contact with the object is measured using the optical system (10).

4. Method according to claim 1, wherein the working distance of the optical system (10) is set with the zoom lens (18) such that the object/measuring plane is in the center of the feeler element (34).

5. Method according to claim 1, wherein the working distance of the optical system (10) is set with the zoom lens (18) such that the object/measuring plane is in front of the feeler element (34).

6. Method according to claim 1, wherein the optical system (10) comprises a zoom lens (18) of which the lens groups (20, 22) are each moved separately by motor power into positions for the imaging scale and the distance from the object, wherein for mechanical/optical measurement of the respective object the light dot, light spot, contrast transition or edge is generated by a feeler element (34) that is brought into contact with the object and whose position is ascertained directly or indirectly using the optical system in the case of a working distance of the optical system set with the zoom lens at which the object/measuring plane intersects the feeler element, and wherein in the case of proximity-type measurement at the respective object the working distance of the optical system is set using the zoom lens such that the object/measuring plane is outside the feeler element.

7. An arrangement for measurement of the geometry of object by means of a coordinate measuring machine with an optical system (10) for measuring an imaging at least one light dot, light spot, contrast transition or edge of which the position is determined by the geometry, on at least one detector (30) whose output signals are evaluated, where a selectable imaging scale and a selectable distance from the respective object can be adjusted using the optical system, wherein the optical system (10) has a zoom lens (18) containing at least two lens groups (20, 22) separately and independently axially movable by motor power, and wherein the working distance can be varied while the imaging scale remains constant, or the imaging scale can be varied while the working distance remains constant.

8. Arrangement according to claim 7, wherein a feeler element (34) and/or at least one target assigned thereto is arranged for optical position determination of the light dot or light spot in front of the optical system (10).

9. Arrangement according to claim 7, wherein the object/measuring plane is set spatially on that side of the feeler element (34) facing the optical system (10) using the zoom lens (18).

10. Arrangement according to claim 7, wherein the object/measuring plane is set spatially in front of that side of the feeler element (34) facing the optical system (10) using the zoom lens (18).

11. Arrangement according to claim 7, wherein the object/measuring plane is set running through the feeler element (34), in particular through the center, using the zoom lens (18).

12. Arrangement according to claim 7, wherein the feeler element (34) is arranged at the end of a light guide feeler pin (36).

13. Arrangement according to claim 7, wherein the light guide feeler pin (36) has at the end a translucent feeler element (34).

14. Arrangement according to claim 7, wherein the feeler element (34) or at least a target assigned thereto is designed as a reflector connected to a pin or shaft (36).

15. Arrangement according to claim 7, wherein the pin or shaft (36) runs, with the exception of a free flexible length contained the feeler element (34) and/or a target assigned thereto, inside a rigid or substantially rigid guide such as the sleeve (40).

16. Array according to claim 15, wherein the pin or shaft is angled into an L-shape and that section of the pin adjacent to the feeler element (34) runs along the optical axis (24) of the optical system (10).

17. Arrangement according to claim 7, wherein the optical system (10) has a zoom lens (18) containing at least two lens groups (20, 22) each separately axially movable by motor power, wherein a feeler element (34) and/or at least one target assigned thereto is provided for optical position determination of the light dot or light spot in front of the optical system (10), and wherein the object/measuring plane is set using the zoom lens (18) spatially on that side of the feeler element (34) facing the respective object in a first operating mode and spatially in front of that side of the feeler element (34) facing the optical system (10) in a second operating mode.

* * * * *